(12) United States Patent
Gong

(10) Patent No.: US 9,388,926 B2
(45) Date of Patent: Jul. 12, 2016

(54) CONNECTING DEVICE OF LARGE-DIAMETER COMPRESSED AIR CONVEYING PIPE

(75) Inventor: Yueqiang Gong, Ningbo (CN)

(73) Assignees: ZHEJIANG COMPRESSED FLUID TRANSMISSION, Gaoxin District; ENGINEERING CO., LTD., Ningbo (CN)

( * ) Notice: Subject to any disclaimer, the term of this patent is extended or adjusted under 35 U.S.C. 154(b) by 401 days.

(21) Appl. No.: 13/994,892

(22) PCT Filed: May 27, 2011

(86) PCT No.: PCT/CN2011/000910
§ 371 (c)(1),
(2), (4) Date: Jun. 17, 2013

(87) PCT Pub. No.: WO2011/157054
PCT Pub. Date: Dec. 22, 2011

(65) Prior Publication Data
US 2014/0001754 A1 Jan. 2, 2014

(30) Foreign Application Priority Data

Jun. 13, 2010 (CN) .......................... 2010 2 0227901
Dec. 8, 2010 (CN) .......................... 2010 1 0577999

(51) Int. Cl.
*F16L 21/00* (2006.01)
*F16L 21/06* (2006.01)
*F16L 23/08* (2006.01)
*F16L 21/02* (2006.01)
*F16L 21/08* (2006.01)

(52) U.S. Cl.
CPC ............... *F16L 21/06* (2013.01); *F16L 21/022* (2013.01); *F16L 21/065* (2013.01); *F16L 21/08* (2013.01); *F16L 23/08* (2013.01)

(58) Field of Classification Search
USPC .......... 285/379, 380, 108, 373, 419; 277/609, 277/614, 616, 608
See application file for complete search history.

(56) References Cited

U.S. PATENT DOCUMENTS

| 4,310,183 A * | 1/1982 | Szalvay .................. 285/114 |
| 4,471,979 A * | 9/1984 | Gibb et al. ................ 285/373 |
| 4,629,217 A * | 12/1986 | Straub .................... 285/112 |

(Continued)

FOREIGN PATENT DOCUMENTS

| CN | 200972022 Y | * | 11/2007 | |
| DE | 10007369 A1 | * | 8/2001 | |
| EP | 463424 A | * | 1/1992 | |
| JP | 2001065758 A | * | 3/2001 | .............. F16L 21/06 |

*Primary Examiner* — David E Bochna
*Assistant Examiner* — James Linford
(74) *Attorney, Agent, or Firm* — Global IP Services; Tianhua Gu

(57) ABSTRACT

A connecting device of large-diameter compressed air conveying pipe comprises an outer hull and a sealing device. An annular mounting slot is set within the outer hull with two annular slopes on both sides, the sealing device includes an annular frame body, two pressing rings and two "O" sealing rings. The two pressing rings are set on both sides of the annular frame body. An internal annular slope and an external annular slope are set on inner corner and outer corner of the pressing ring respectively. Two second annular slopes are set at two tops of the pressing ring respectively. "O" sealing rings are respectively sat on the internal annular slopes of the pressing rings. Two ends of the annular frame body press the "O" sealing rings respectively.

9 Claims, 4 Drawing Sheets

(56) References Cited

U.S. PATENT DOCUMENTS

| | | | |
|---|---|---|---|
| 5,066,053 A * | 11/1991 | Miller | 285/373 |
| 6,581,977 B1 * | 6/2003 | Dole et al. | 285/112 |
| 2003/0227171 A1 * | 12/2003 | Legeai et al. | 285/373 |
| 2006/0255592 A1 * | 11/2006 | Minemyer et al. | 285/373 |

* cited by examiner

CONNECTING DEVICE OF LARGE-DIAMETER COMPRESSED AIR CONVEYING PIPE

CROSS REFERENCE TO RELATED PATENT APPLICATION

The present application is the US national stage of PCT/CN2011/000910 filed on May 27, 2011 which claims the priorities of the Chinese patent application No. 201020227901.1 filed on Jun. 13, 2010 and No. 201010577999.8 filed on Dec. 8, 2010, which applications are incorporated herein by reference.

TECHNICAL FIELD OF THE INVENTION

The invention concerns the conveying piping system for compressed air, especially the connecting device of a kind of large-diameter compressed air conveying pipe.

BACKGROUND OF THE INVENTION

A variety of pipe joints are used to connect the compressed air pipe right now. There is a common problem for the existing pipe joints, after connecting the connection between the pipe and joint is not firm, and may appear the axial displacement. Therefore, the applicant filed an application titled "a kind of compressed air quick pipe joint" (Application No. 200810063105.6, application date: 2008, Jul. 10). The pipe joint includes the joint tube and end cover, they are connected through removable thread. The snap ring holder is set at the end of the joint tube; the inner end of snap ring holder extends to the inside of joint tube, the sealing ring is set when connected with the snap ring holder. The inner ring of the sealing ring protrudes the inner diameter setting of snap ring holder; the outer end face of snap ring holder sets the metal circlip, including the ring body and tine. The tine turns up towards the direction of snap ring holder, and sets the inclined circle at the opening of snap ring holder. The tine is set in the inclined circle. The promotion component is set at the outer end of circlip, and the two ends are connected with the circlip and boss. When using, tighten the end cover, the boss will push the promotion component, which can push the circlip to strut the tine, and the tine can bite the tube to prevent the prolapse. The patent pipe joint is featured with simple structure, convenient implementation and reliable connection.

However, the large compressed air piping system needs the large-diameter and small-diameter conveying pipes. The pipe joint of the above-mentioned patent is applicable for the connection of small pipeline only. When applying the large-diameter pipeline, for its dead load, the above mentioned pipe joint cannot satisfy the requirement for the connection strength.

SUMMARY OF THE INVENTION

In order to solve the technology defect that the common pipe joint cannot satisfy the requirements for the large-diameter pipeline, the present invention aims to provide a new connection device for large-diameter compressed air conveying pipes. The device can be applied to the large-diameter pipeline connection with the features of simple structure, convenient implementation and reliable connection.

In order to achieve the above aim, the invention adopts the following technology solution.

The connection device for large-diameter compressed air conveying pipe is composed by a metal outer hull and a sealing device. The metal outer hull is composed by the first half ring body and the second half ring body. The locking component is set between the first half ring body and the second half ring body; the annular mounting slot is set in the chamber of the metal outer hull. The first annular slope is respectively set at the two sides of the annular mounting slot. The first annular slope is taper shape. The annular mounting slot is connected with the lumen of metal outer hull through the first annular slope; the sealing device is composed by the annular frame body, two pressing rings and two "O" sealing rings. Two pressing rings are set on both sides of the annular frame body. The cross section of the pressing ring is of "U" shape. The mounting hole is set at the center part of the pressing ring. The external annular slope is respectively set at the shoulder part. Two "O" sealing rings are respectively set at the inner corner of the pressing rings. Two ends of annular frame body are respectively contacted with the "O" sealing rings; Moreover, the internal annular slope is set at the inner corner of the pressing ring, the second annular slope is set at two ends of the annular frame body. After locking the first half ring body and the second half ring body, the sealing device is set within the annular mounting slot and the first annular slopes. The external annular slope is contacted with the first annular slope, the inner diameter of "O" sealing ring is larger than that of the mounting hole.

As the optimization, two positioning cards are set continuously or internally within the lumen of metal outer hull outside the first annular slope, and the limit slot can be formed among two positioning cards for the bulge loop on clamping conveying pipe. The limit slot can make the axial position for the conveying pipe with bulge loop.

As the optimization, the internal annular slope is set at the corner of inner ring of pressing ring. The second annular slope is respectively set at the two ends of the annular frame body.

As the improved technology solution, the locking plate is set at the connection part between the first half ring body and second half ring body. The locking component is bolt, which shall be set at the locking plate to lock the first half ring body and the second half ring body.

As the improved technology solution, the mounting opening is set at the locking plate of the first half ring body. The thread opening is set at the locking plate of the second half ring body. The bolt is set in the mounting opening to connect with the thread opening.

As the improved technology solution, the elastic fitting is set at the locking plate at the connection part between the first half ring body and one side of the second half ring body to connect the first half ring body and the second half ring body. The elastic fitting can be used to connect the first half ring body and the second half ring body on the one side, on the other side, it can primarily locate the first half ring body and the second half ring body, which is easy to mount.

As the optimization, the above elastic fitting is the rubber strip in the locking plate. The boss is respectively set at the two ends of the rubber strip.

As the improved technology solution, the annular limit slot is set at the middle of the outer annular frame body, multiple axially extended components are respectively set at the annular limit slot towards two pressing rings, the grab is respectively set at the extended component, and the grab shall be in the annular limit slot. The extended component can make two pressing rings in the annular frame body and prevent the scattering of each part in the sealing device.

As the improved technology solution, many axially limit strips are set at the periphery of the annular limit slot. The limit strips can separate many limit notches in the annular limit slot. The limit notch can limit the circumferential rotation of the pressing ring.

As the improved technology solution, the extended component in two pressing rings shall be malposition set in the limit notch, and the grab shall be within the limit notch.

As the optimization, there are 3 extended components in the circumference of the pressing ring.

As the optimization, the annular lug is respectively set at the two ends of metal outer hull, and it forms the support opening of conveying pipe. For the large-diameter compressed air conveying pipe has a larger dead load, therefore, it is better to set the support opening at the two ends of metal outer hull to support the conveying pipe.

Before locking the first half ring body and the second half ring body, the inner diameter of "O" sealing ring within the sealing device in the invention is larger than that of the mounting hole, thus the compressed air conveying pipe can conveniently insert the sealing device. Then make the first half ring body and the second half ring body in the sealing device, and lock them with the locking component. The stress of the first annular slope on the external annular slope can promote the two pressing rings to move towards the annular frame body. For the effect of the internal annular slope and the second annular slope, "O" sealing ring bulges inward, thus closely connecting the "O" sealing ring and the outer face of the compressed air conveying pipe and realizing the sealing connection and position of the pipe. The invention adopts the above technology solution, which can be applied to the large-diameter pipe connection with the feature of simple structure, convenient implementation and reliable connection.

DETAIL DESCRIPTION OF THE INVENTION

The invention is described in conjunction with the attached figures.

Figure 1:
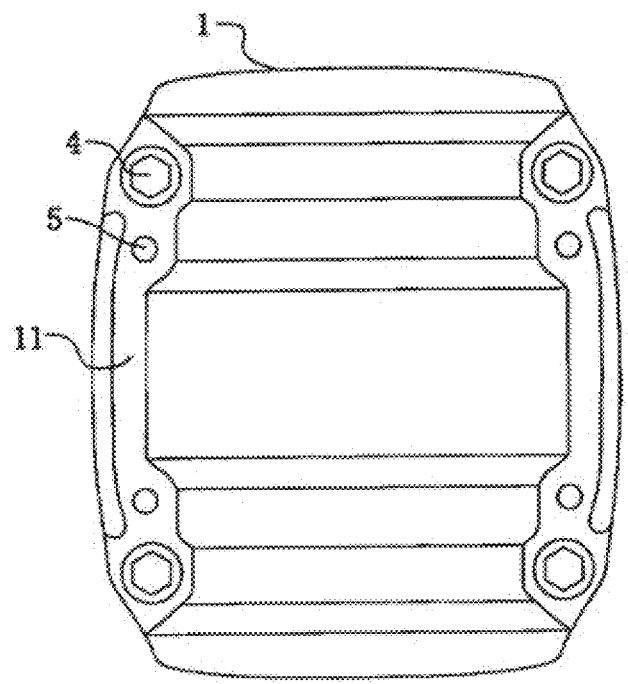
FIG. 1 is the external structure diagram of the invention.
Figure 2:
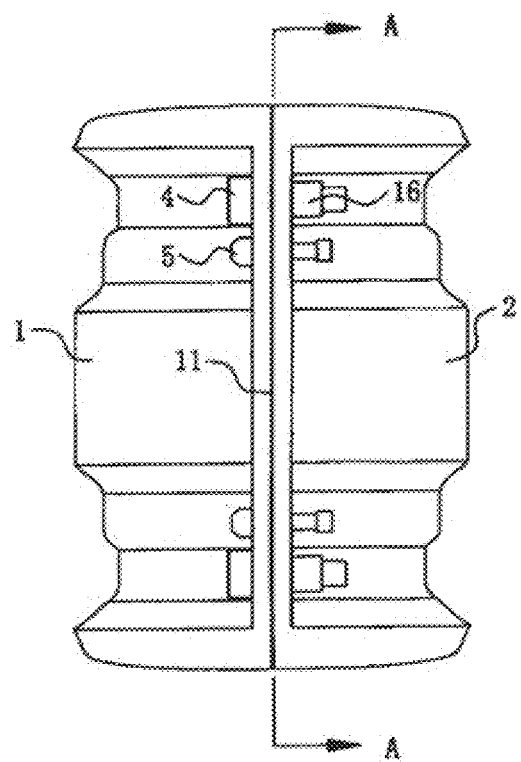
FIG. 2 is the right side view of FIG. 1.
Figure 3:
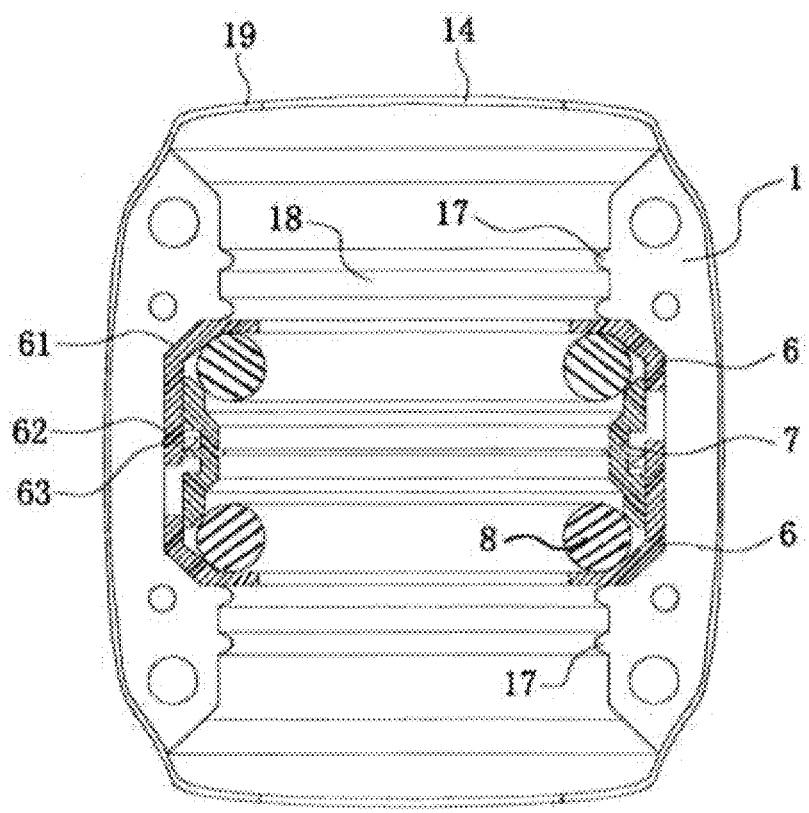
FIG. 3 is the A-A cross-sectional view of FIG. 2.

A connection device of large-diameter compressed air conveying pipe is shown in FIG. 1, FIG. 2 and FIG. 3, the device is composed by the metal outer hull and sealing device. The metal outer hull is composed by the first half ring body 1 and the second half ring body 2, and the locking component is set between them for connecting. The annular lug 19 is respectively set at the two ends of the metal outer hull, and it forms the support opening 14 of the conveying pipe 9. As shown in FIG. 1 and FIG. 2, the locking plate 11 is set at the connection part between the first half ring body 1 and the second half ring body 2, the locking component is bolt 4, and the mounting hole 15 is set at the locking plate 11 of the first half ring body 1. The thread hole 16 is set at the locking plate 11 of the second half ring body. The bolt 4 is set in the mounting hole to connect with the thread hole 16. Meanwhile, the elastic fitting is set at the locking plate 11 between the first half ring body 1 and the second half ring body 2. The elastic fitting is a rubber strip 5 on the locking plate 11.

As shown in FIG. 3, the annular mounting slot 12 is set in the chamber of the metal outer hull. The first annular slope 13 is respectively set at the two sides of annular mounting slot 12. The first annular slope 13 is taper shape. The annular mounting slot 12 is connected with the first annular slope 13. Two annular lug 19 are set at the opening end of the chamber of the metal outer hull outside the first annular slope 13, and the limit slot 18 is formed among two annular lug 19 for the bulge loop 91 on the clamped conveying pipe 9.

Figure 5:
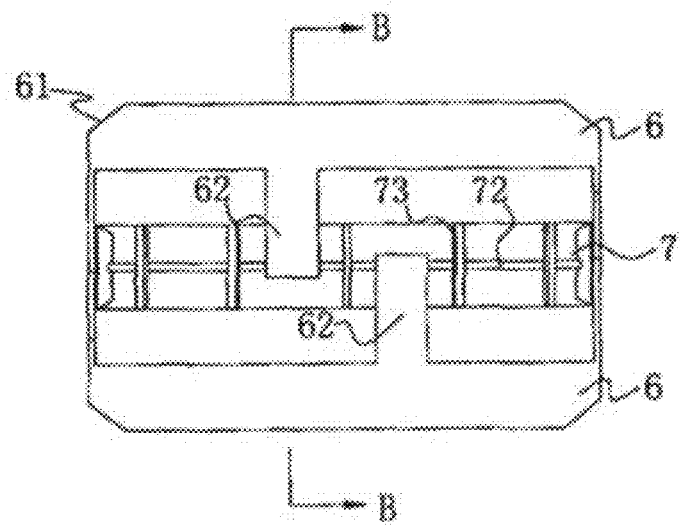
FIG. 5 is the external structure diagram of the sealing device of the invention.
Figure 6:
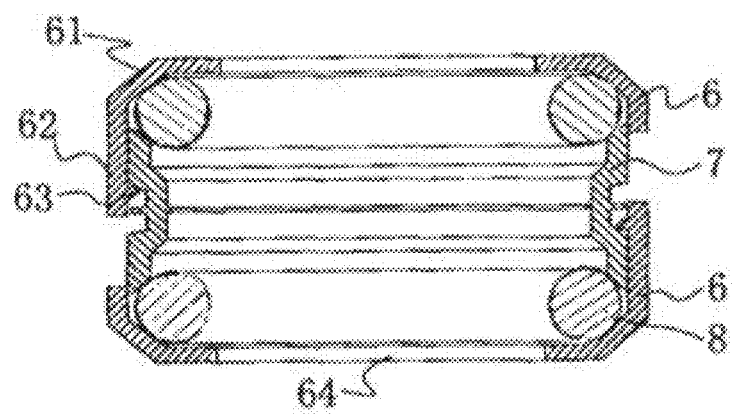
FIG. 6 is the B-B cross-sectional view of FIG. 5.
Figure 7:
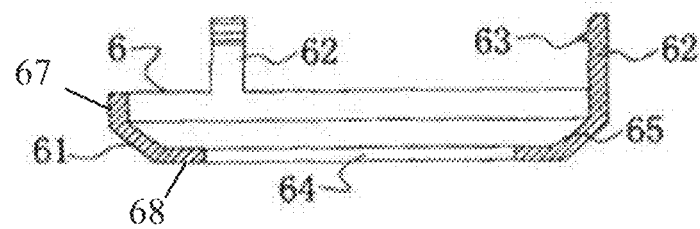
FIG. 7 is the structure diagram of the pressing ring of the invention.
Figure 8:
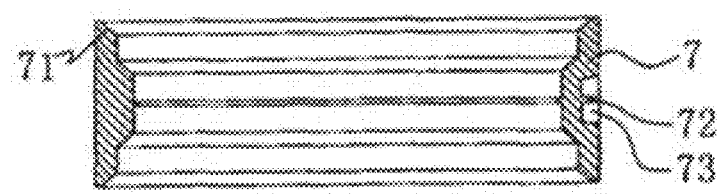
FIG. 8 is the structure diagram of the annular frame body of the invention.
Figure 9:
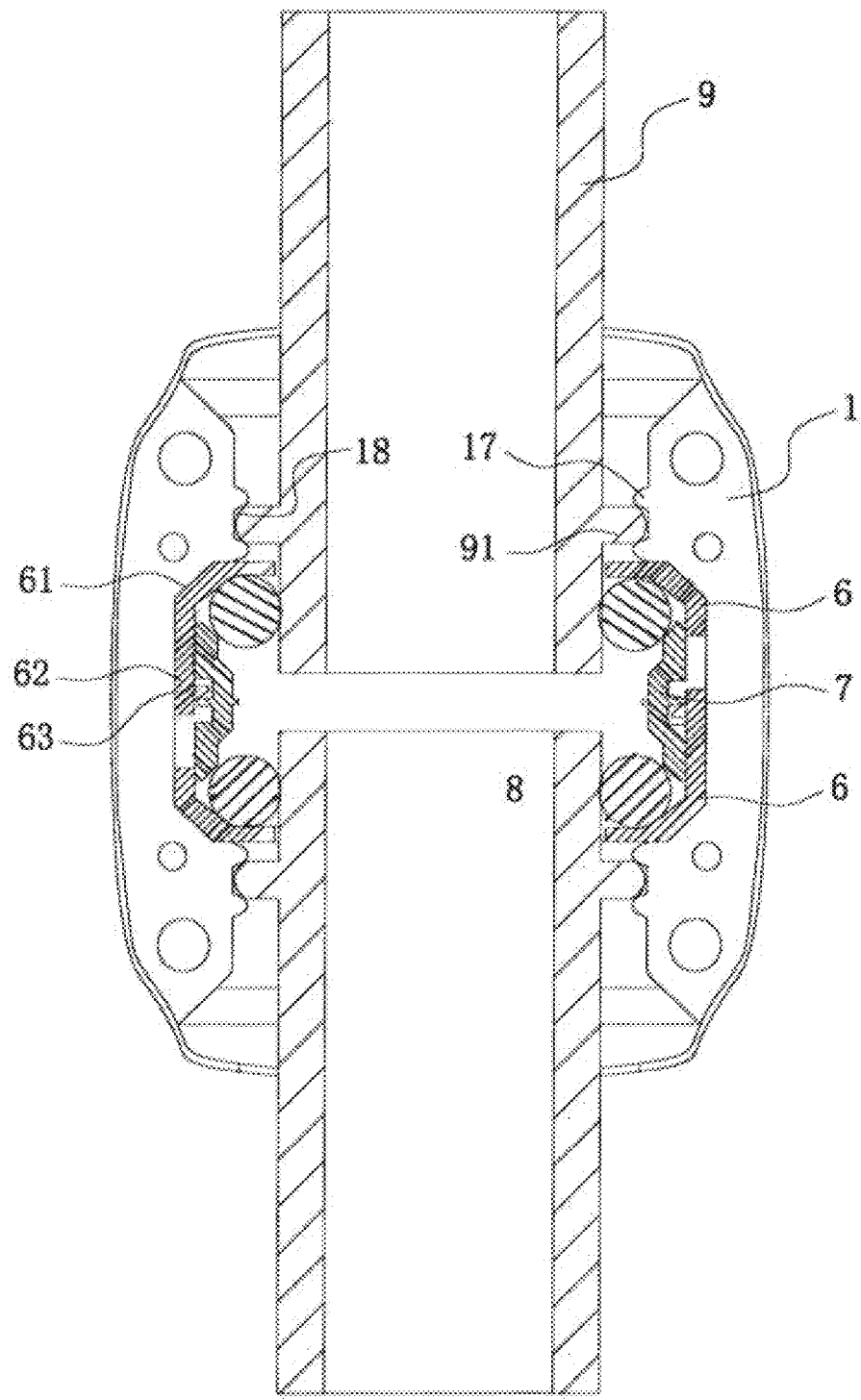
FIG. 9 is the using structure diagram of the invention.

As shown in FIG. 5 and FIG. 6, the sealing device is composed by the annular frame body 7, two pressing rings 6 and two "O" sealing rings. Two pressing rings are set at two sides of the annular frame body 7. As shown in FIG. 8, the annular limit slot 72 is set at the middle of annular frame body 7. Many axially limit strips 73 are set at the periphery of the annular limit slot 72. The limit strips 73 separate the annular limit slot 72 as many limit notches. As shown in FIG. 7, three axially extended components 62 are respectively set on the pressing rings 6 towards the annular limit slot 72. The grab 63 is respectively set on the extended component 62. By turning the pressing ring 6 the grab 63 on the extended component 62 enters the limit notch 72.

As shown in FIG. 6, the cross section of the pressing ring 6 is of a "U" shape, the mounting hole 64 is set at the center part of the bottom 68 of the pressing ring 6, the external annular slope 61 is set at the outside corner of the pressing ring 6, (the corner means the connection part between the bottom 68 and the circle wall 67). Two "O" sealing rings 8 are respectively set at the inner corners of two pressing rings 6. The two ends of annular frame body 7 contact with two "O" sealing rings 8; Moreover, the internal annular slope 65 are set at the inside and outside corners of the pressing ring 6. The second annular slopes 71 are respectively set at the two ends of the annular frame body 7.

Figure 4:
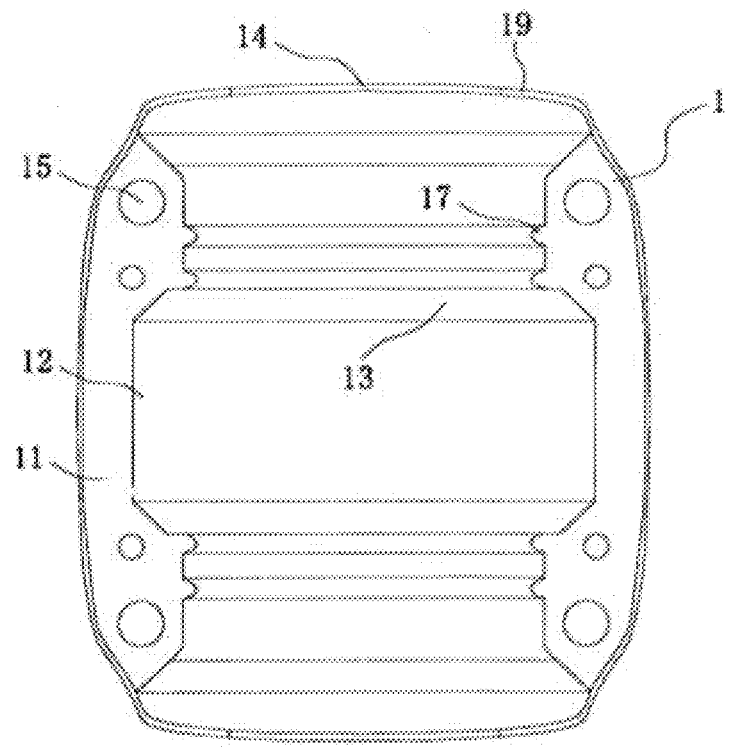
FIG. 4 is the internal structure diagram of the first half ring body of the invention.

The inner diameter of the "O" sealing ring 8 in the sealing device is larger than that of the mounting hole 64 (As shown in FIG. 6), thus the end of the compressed air conveying pipe 9 can be conveniently inserted into the sealing device. Then close the first half ring body 1 and second half ring body 2 to hold the sealing device, and lock them with the locking components. The bulge loop 91 in the conveying pipe 9 is set within the limit slot 18. The limit slot 18 is the axially positioning of conveying pipe 9. Furthermore, the stress from the first annular slope 13 to the external annular slope 61 pushes two pressing rings 6 to move towards the annular frame body 7. Under the squeeze of the internal annular slope 65 and the second annular slope 71, the "O" sealing ring 8 bulges inward, thus closely connecting the "O" sealing ring 8 on the outside of the compressed air conveying pipe 9 and realizing the sealing connection and position of the pipe (As shown in FIG. 4).

What is claimed is:
1. A connecting device of large-diameter compressed air conveying pipe comprising:
an outer hull includes:
a first half ring body (1), a second half ring body (2) and a locking component for connecting the first half ring body (1) and the second half ring body (2);
an annular mounting slot (12) is set within the outer hull with two first annular slopes (13) at both sides thereof;
a sealing device includes:
an annular frame body (7), two second annular slopes (71) are respectively set at two ends thereof;

two pressing rings (6) are respectively set at two sides of the annular frame body (7), each pressing ring (6) having a "U"-shape in cross-section is formed by a bottom (68) and a circle wall (67), a mounting hole (64) is set at a center part of the bottom (68), an internal annular slope (65) and an external annular slope (61) connect the bottom (68) and the circle wall (67) inside and outside the pressing ring respectively; an annular limit slot (72) is set at middle of the annular frame body (7), each pressing ring (6) has a multiple of axially extended components with grabs (63) and the pressing ring is connected with the annular frame body (7) when the grab (63) is in the annular limit slot (72);

a multiple of axially limit strips (73) divide the annular limit slot (72) as a multiple of limit notches, the extended components (62) of one pressing ring (6) are offset to the same in another pressing ring, and the grabs (63) are located in the multiple of limit notches;

two "O" sealing rings (8) are sat on the internal annular slopes (65) of two pressing rings (6) respectively, two ends of the annular frame body (7) are respectively touched with the two "O" sealing rings (8), an inner diameter of each "O" sealing ring (8) is larger than that of the mounting hole (64);

after locking the first half ring body (1) with the second half ring body (2), the sealing device is located within the annular mounting slot (12), the external annular slope (61) is touched with the first annular slope (13).

2. The connecting device of large-diameter compressed air conveying pipe of claim 1, wherein two positioning bulge-rings (17) are set within the outer hull and beside the first annular slope (13), a limit slot (18) is formed among the two positioning bulge-rings (17) for a bulge loop (91) on a clamped conveying pipe (9).

3. The connecting device of large-diameter compressed air conveying pipe of claim 1, wherein a locking plate (11) is respectively set at connecting part between the first half ring body (1) and the second half ring body (2), locking components are bolts (4).

4. The connecting device of large-diameter compressed air conveying pipe of claim 3, wherein mounting holes (15) are set at the locking plate (11) of the first half ring body (1), thread holes (16) are set at the locking plate (11) of the second half ring body (2).

5. The connecting device of large-diameter compressed air conveying pipe of claim 4, wherein a elastic fitting is set at the locking plate (11) between the first half ring body (1) and the second half ring body (2) for connecting the first half ring body (1) and the second half ring body (2) when opening.

6. The connecting device of large-diameter compressed air conveying pipe of claim 5, wherein the elastic fitting is a rubber strip (5), two ends of the rubber strip (5) has flange respectively.

7. The connecting device of large-diameter compressed air conveying pipe of claim 3, wherein an elastic fitting is set at the locking plate (11) between the first half ring body (1) and the second half ring body (2) for connecting the first half ring body (1) and the second half ring body (2) when opening.

8. The connecting device of large-diameter compressed air conveying pipe of claim 7, wherein the elastic fitting is a rubber strip (5), two ends of the rubber strip (5) has flange respectively.

9. The connecting device of large-diameter compressed air conveying pipe of claim 1, wherein two annular lug (19) is respectively set at the two ends of the outer hull to form two support openings (14) for the conveying pipe (9).

* * * * *